United States Patent [19]

Hahn et al.

[11] 4,379,354

[45] Apr. 12, 1983

[54] RELEASABLE LOCKING DEVICE

[75] Inventors: Norbert Hahn, Cudahy; Steven J. Hipp, Milwaukee, both of Wis.

[73] Assignee: Rite-Hite Corporation, Milwaukee, Wis.

[21] Appl. No.: 290,348

[22] Filed: Aug. 5, 1981

[51] Int. Cl.³ .............................................. E01D 1/00
[52] U.S. Cl. .................................... 14/71.3; 248/293; 292/98; 292/111
[58] Field of Search ..................... 14/71.3, 72.5, 71.1, 14/71.7; 248/293, 294; 292/111, 98

[56] References Cited

U.S. PATENT DOCUMENTS

| | | | |
|---|---|---|---|
| 610,656 | 9/1898 | Martin | 248/293 |
| 1,128,614 | 2/1915 | Landemare | 248/294 |
| 1,169,643 | 1/1916 | Hickenbotham | 292/98 X |
| 1,489,965 | 4/1924 | Prentice | 292/98 X |
| 2,403,820 | 7/1946 | Miller | 404/110 |
| 2,405,240 | 8/1946 | Shearer | 292/98 X |
| 2,954,241 | 9/1960 | Warren | 404/110 X |
| 4,114,718 | 9/1978 | Lipshield | 292/111 X |
| 4,279,050 | 7/1981 | Abbott | 14/71.3 |

*Primary Examiner*—Nile C. Byers, Jr.
*Attorney, Agent, or Firm*—Neuman, Williams, Anderson & Olson

[57] ABSTRACT

A device is provided for releasably locking a parked vehicle to an adjacent loading dock. The device includes a vertically adjustable carriage mounted on the front wall of the dock, and a hook-like member supported by the carriage for independent rotary movement between an operative vehicle-interlocking position and an inoperative vehicle-release position. A carriage-supported first member is disposed coaxially with the axis of said hook-like member and moves therewith as a unit. A flexible second member engages the first member and upon a predetermined pulling force being applied to said second member, causes the hook-like member to move to the operative vehicle-interlocking position. A unit is operatively connected to the flexible second member whereby the predetermined pulling force applied thereto is enhanced so as to effect a substantially greater turning force being exerted on the first member. Mounted on the carriage and disposed adjacent the first member is a releasable lock element which retains the hook-like member in the operative vehicle-interlocking position. Manually actuated means is connected to the lock element to effect controlled disengagement of the element from the first member whereby the hook-like member will automatically assume an inoperative vehicle-release position.

11 Claims, 8 Drawing Figures

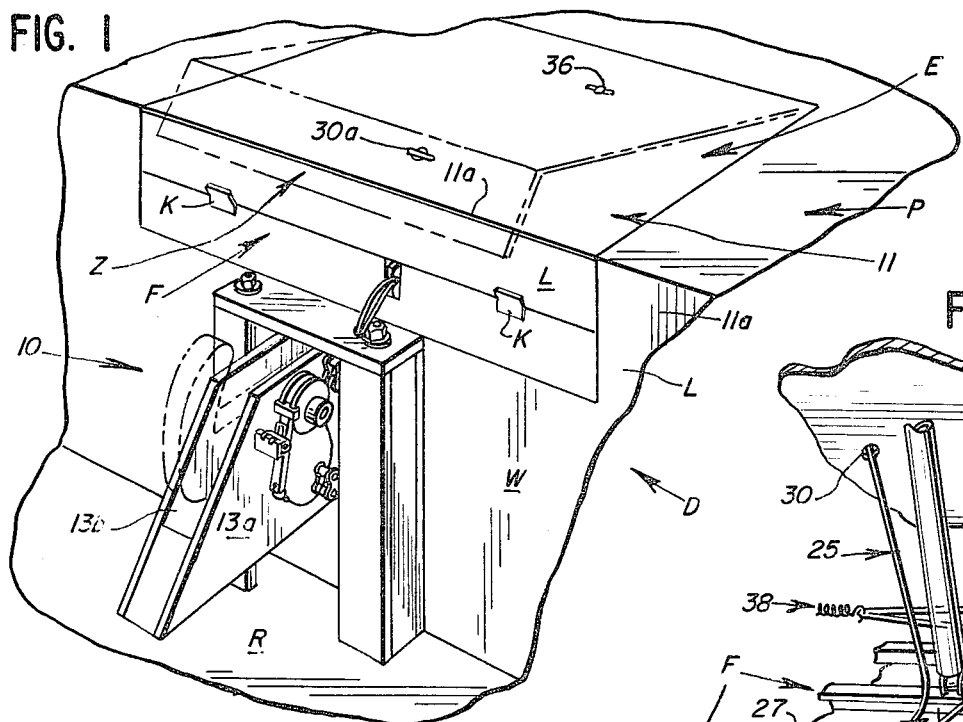
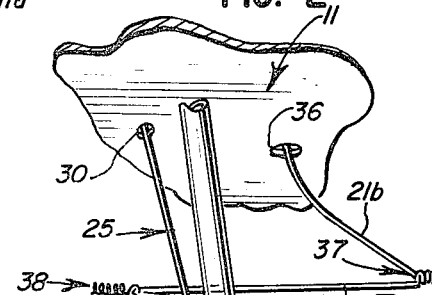
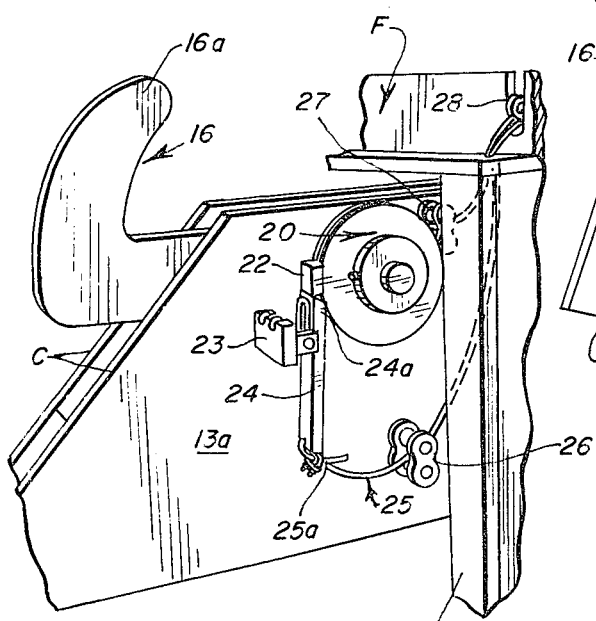
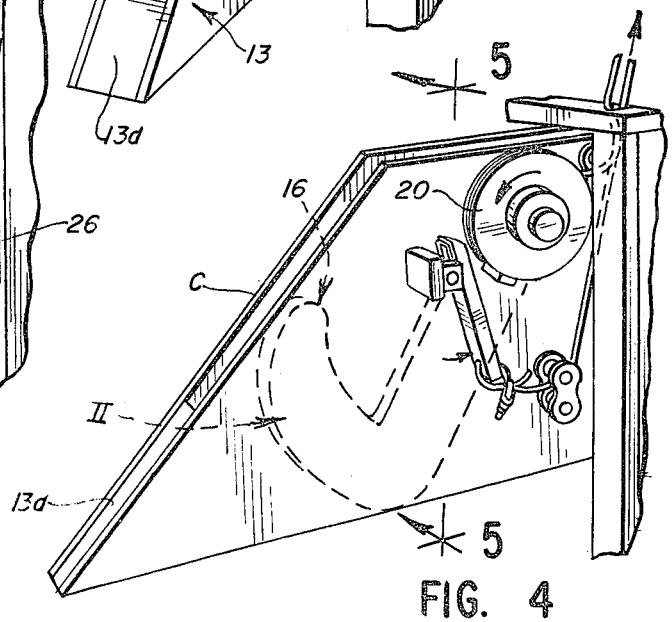

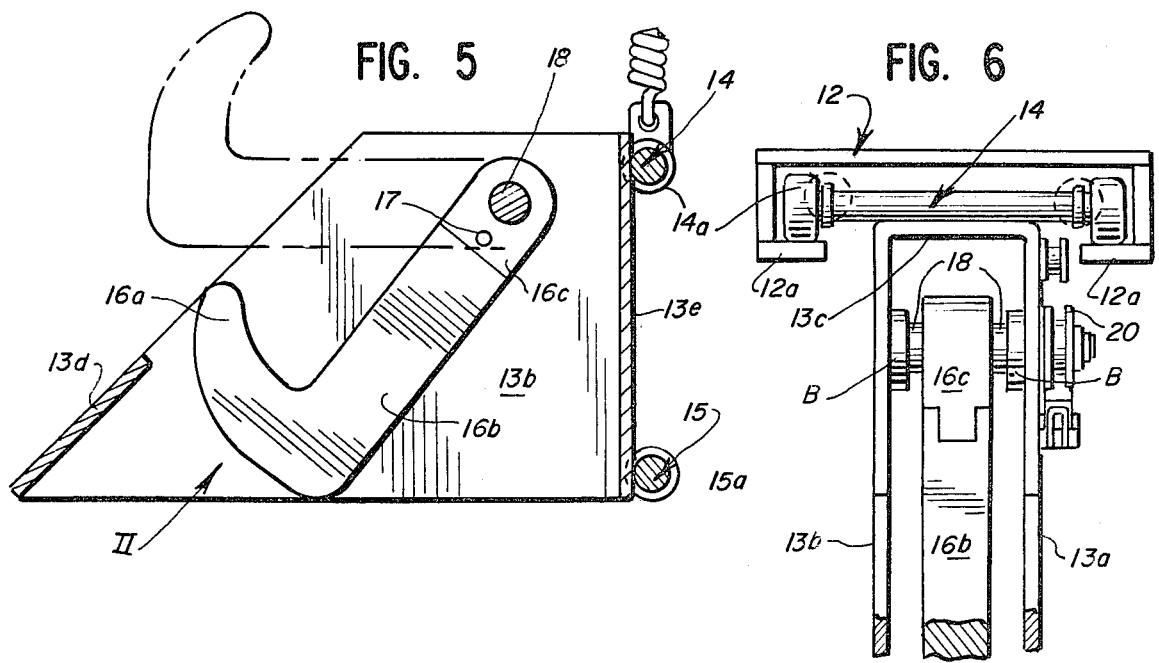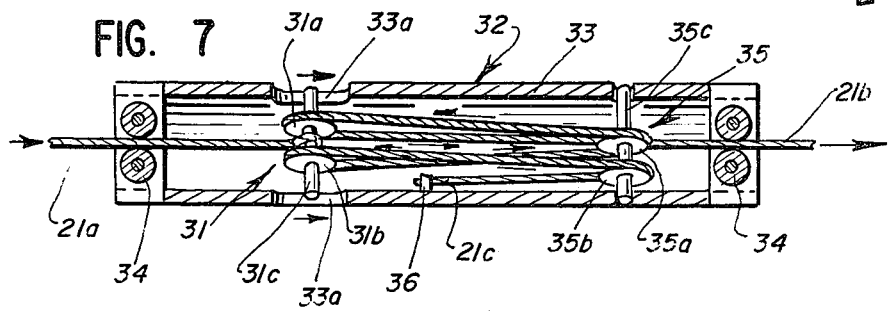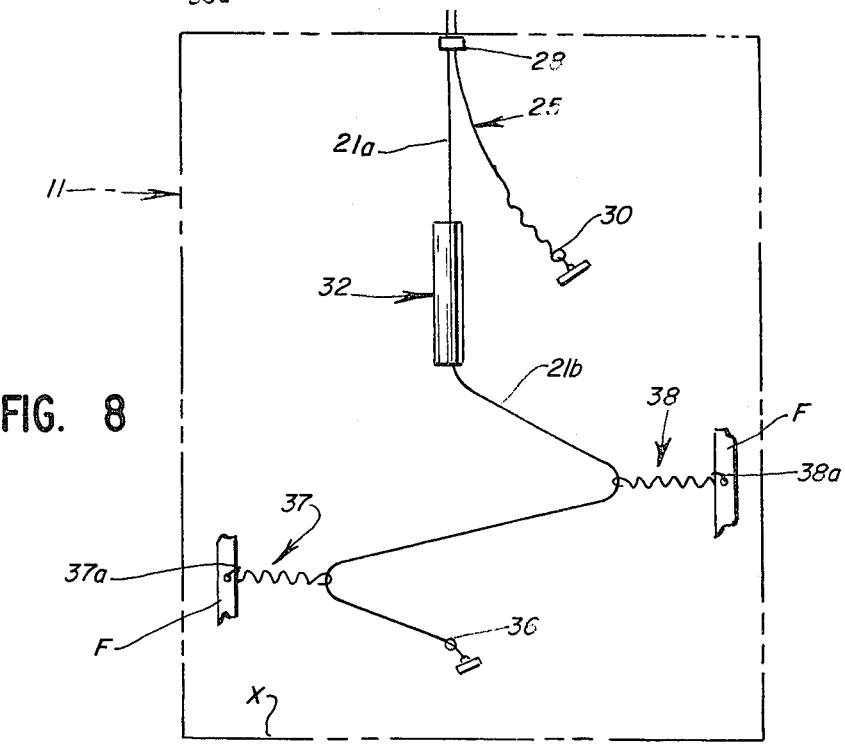

RELEASABLE LOCKING DEVICE

BACKGROUND OF THE INVENTION

It has been found that a vast majority of accidents which occur at a loading dock are due to human error. The seriousness of these accidents is oftentimes increased in instances where powered material handling equipment is utilized in loading and/or unloading a truck parked at the dock. An inordinate number of these accidents are precipitated by the parked truck being improperly secured in place, or the driver of the truck inadvertently and prematurely moves the truck away from the dock before the loading dock personnel and handling equipment have cleared the truck bed.

Heretofore, in an effort to reduce this potential hazard, various devices have been employed to secure the parked truck in place such as blocks, cables, chains, and the like. These devices, however, have oftentimes proved ineffective for one or more of the following reasons: (a) the blocks became lost or stolen, (b) the blocks were ineffective where the surface of the roadway supporting the truck was slippery due to rain, snow, ice, and/or oils: (c) the cable or chain was awkward and difficult to handle; (d) unless the blocks were properly wedged in place or the cable or chain made taut, the truck had a tendency to creep away from the dock as the material handling equipment moved on and off the truck bed; and (e) the primary responsibility for properly utilizing such devices rested with the truck driver and not the dock attendant, and therefore, such driver might become preoccupied on other matters and forget to take the necessary precautionary steps to insure proper securement of his vehicle to the dock, or the driver might consider such devices or precautionary steps a nuisance and thus ignore same.

In other instances more elaborate securing devices have been proposed which are either of a costly and complex construction; require an outside source of electrical, pneumatic, and/or hydraulic power to effect operation thereof; are highly susceptible to malfunction due to changes in climatic conditions; interfere with the full use of the loading dock when powered material handling equipment is being utilized; or are incapable of interlockingly engaging the ICC bars of parked vehicles where the height of the ICC bars varies over a wide range.

SUMMARY OF THE INVENTION

Thus, it is an object of the invention to provide a device of the type described which avoids all of the aforenoted shortcomings associated with such prior devices.

It is a further object to provide a vehicle locking device which is of simple, yet, rugged construction and is capable of effectively accommodating a wide variety of vehicles.

It is a further object to provide an improved vehicle locking device which may be readily installed on new or existing loading docks embodying various types of dock leveling equipment.

Further and additional objects will appear from the description, accompanying drawings, and appended claims.

In accordance with one embodiment, a device is provided for releasably securing a parked vehicle to an adjacent loading dock during loading and/or unloading of the vehicle. The dock includes dock leveling equipment provided with a hingedly mounted load-bearing deck. The deck hinge axis is spaced rearwardly from and is substantially parallel to the front wall of the dock. The deck is adapted to be tilted upwardly or downwardly to compensate for any height variations in the bed of the parked vehicle relative to the height of the loading dock. The locking device includes a vertically adjustable carriage which is mounted on the front wall of the dock and is relatively centered with respect to the front edge of the hinged deck. Mounted on the carriage and movable therewith is a hook-like member which pivots independently of the carriage between an outwardly projecting vehicle-interlocking operative position and a depending vehicle-release inoperative position. Also mounted on the carriage and coaxially disposed with respect to the pivot axis of the hook-like member and movable with the latter as a unit, is a first member. A flexible second member engages the first member and has an end portion thereof extending through a suitable opening formed in the deck, said opening being disposed, relatively close to the hinge axis. The end portion of the flexible member is adapted to be manually engaged by a person standing on the deck. Upon upward pulling of the flexible member end portion by such person, a turning force is transmitted to the first member causing the hook-like member to assume its operative position. A manually actuated lock element is also provided which automatically retains the hook-like member in its operative position. When manually actuated, the lock element will become disengaged from the first member allowing the hook-like member to assume its inoperative position.

DESCRIPTION

For a more complete understanding of the invention, reference should be made to drawings wherein:

FIG. 1 is a fragmentary perspective view showing one embodiment of the improved locking device mounted on the front wall of a loading dock, the latter being provided with dock leveling equipment having a hinged load-bearing deck; the deck in an upwardly tilted position and the hook-like member in an operative position being shown in phantom lines.

FIG. 2 is a fragmentary front perspective view of the locking device of FIG. 1 with the hook-like member in an operative position and showing the deck of the dock leveling equipment in an upwardly tilted position.

FIGS. 3 and 4 are enlarged fragmentary side elevational views of the locking device of FIG. 1 and showing, respectively, the hook-like member in operative and inoperative positions.

FIG. 5 is an enlarged fragmentary vertical sectional view of the locking device of FIG. 1 with the hook-like member shown in phantom lines in an operative position.

FIG. 6 is an enlarged fragmentary top plan view of the locking device of FIG. 3.

FIG. 7 is an enlarged fragmentary vertical sectional view of a pulley assembly mounted on a frame forming a part of the dock leveling equipment.

FIG. 8 is a fragmentary top plan view showing the pulley assembly of FIG. 7 and a slack-compensating means for the cable extending from the pulley assembly through an opening formed in the deck near the hinge axis thereof; the deck being outlined in phantom lines.

Referring now to the drawings and more particularly to FIG. 1, a conventional loading dock D is shown which is provided with dock leveling equipment E. The equipment E may be of the general type disclosed in U.S. Pat. No. 4,110,860 dated Sept. 5, 1978. The operation and installation of the leveling equipment E is well known in the art and only relevant components of the equipment will be described in detail hereinafter with regard to the locking device 10. The dock D includes a horizontally disposed platform surface P which is elevated relative to a roadway R supporting the vehicle, not shown, parked at the dock during loading or unloading of the vehicle.

The dock leveling equipment E includes a frame F which is fixedly mounted within a suitable pit, or recess, formed in the platform surface. One side of the pit is open at the vertical front wall W of the dock. Hingedly connected to the reear of the frame is a planar deck 11 which assumes a substantially co-planar relation with the dock platform surface P when the deck is in an inoperative or cross-traffic mode Z, as seen in FIG. 1. The front edge 11a of the deck 11 has a lip L pivotally connected thereto. When the deck is in its inoperative mode Z, the lip extends vertically downwardly and has the lower edge thereof resting within suitable keepers K affixed to the front side of frame F. When the lip is engaging the keepers, the deck 11 is supported in a horizontal plane.

When the vehicle is parked at the dock for loading and/or unloading, the deck 11 with the depending lip L is manually tilted upwardly as a unit so that the lower edge of the lip will clear the edge of the bed of the parked vehicle. Once the upwardly tilted deck and lip have reached a predetermined position, the lip L will automatically pivot outwardly as seen in phantom lines in FIG. 1 whereupon the deck and extended lip will slowly pivot downwardly as a unit until the outer edge portion of the lip rests upon the bed of the parked vehicle.

The improved locking device 10, as aforementioned, is mounted on the front wall W of the dock D and includes a stationary member 12 which is fixedly secured to wall W by any suitable means. Member 12 is centrally located relative to the front edge 11a of deck 11 and extends downwardly from the open side of the pit in which the frame F of dock-leveling equipment E is disposed.

Mounted on member 12 for limited vertical movement relative thereto is a carriage 13. The carriage is biased by suitable heavy coil springs, not shown, so as to assume a normal predetermined position which is at the greatest elevation relative to roadway R. The carriage 13, as seen in FIG. 6, includes a pair of plate members 13a, 13b arranged in spaced parallel relation and projecting transversely outwardly from member 12. The inner edges of the plate members, that is, the edges disposed adjacent member 12, are interconnected by a web section 13c.

Fixedly secured to web section 13c and extending laterally therefrom are guide elements 14, 15. One element 14 is mounted adjacent the upper edge portion of the web section 13c, and the other element 15 is mounted adjacent the lower edge portion of section 13c, see FIG. 5. The outer ends of guide elements 14, 15 are preferably provided with suitable rollers 14a, 15a which are in rolling contact with outwardly disposed, elongated guide tracks 12a formed on member 12. By reason of the vertical spacing between elements 14, 15, the carriage 13 is provided with greater stability during movement relative to member 12.

To maintain plate members 13a, 13b in spaced parallel relation, the lower segment of the outer edge portions thereof are interconnected by a spacer section 13d. As noted in FIG. 5, the outer edge portions of the plate members 13a, 13b extend angularly upwardly towards member 12 and thus, form a cam C which is adapted to be engaged by the ICC bar of the vehicle when the latter is being maneuvered into a parked position with respect to the loading dock. As the vehicle is backed into place, the ICC bar will contact the cam C and cause the carriage 13 to move downwardly relative to member 12 until the bar can be interlockingly engaged by a hook-like member 16 which is pivotally mounted on the carriage and is disposed between the plate members 13a, 13b. Member 16 is adapted to pivot between an operative mode I, see FIGS. 2 and 3, and an inoperative mode II, see FIGS. 4 and 5.

The hook-like member 16 has an outer distal portion 16a which extends angularly upwardly and is adapted to interlock or capture the ICC bar of the parked vehicle between portion 16a and member 12, when the hook-like member assumes the operative mode I. When the hook-like member 16 is in its inoperative mode II, it is substantially concealed between the plate member 13a, 13b with no portion of member 16 protruding outwardly from the cam surface C of the plate members. Member 16 is preferably of a composite construction having an outer section 16b and an inner section 16c. The sections are interconnected to one another by a suitable shear pin 17, see FIG. 5. Inner section 16c is keyed to a transversely extending shaft 18 which is supported by conventional bearings B mounted on plate members 13a, 13b.

One end of shaft 18 projects laterally outwardly from plate member 13a. Keyed to the projecting end of shaft 18 is a wheel or pulley member 20 having a circumferential groove 20a. One end of a flexible cable 21 is wound about the wheel member and is disposed within the groove and effects rotation of the wheel member in one direction. Affixed to the periphery of member 20 is a stop piece 22, the function of which will be described more fully hereinafter.

Projecting laterally from the exposed side of plate member 13a is a bracket 23 on which is pivotally mounted a stop lever 24. As seen in FIG. 3, lever 24 is pivotally connected intermediate its ends to bracket 23 and is pring biased in a clockwise direction so that the upper end 24a of the lever will slidably engage the periphery of wheel plate member 20. The disposition of the stop piece 22 on the periphery of wheel member 20 is such that the upper end 24a of lever 24 will subtend and abut piece 22 only when the hook-like member 16 has assumed its operative mode I and thus automatically prevents member 16 from moving to its inoperative mode II.

When lever 24 is pivoted in a counter-clockwise direction, as viewed in FIG. 3, so as to disengage the lever end 24a from the stop piece 22, the unbalancing weight of the hook-like member 16 will cause the latter to automatically become released from the ICC bar of the parked vehicle and return to its inoperative mode II.

The counter-clockwise pivotal movement of lever 24 is effected by a flexible pull cable 25 having one end 25a connected to the lower end 24b of lever 24. Cable 25 engages a pair of guides 26, 27 which are mounted on the exposed surface of plate member 13a. Guide 27 is elevated relative to guide 26 and is adapted to also be engaged by the cable 21 which is wound about the periphery of wheel member 20 and extends tangentially therefrom.

Upon leaving guide 27, both cables 21, 25 pass through an additional guide 28 which is fixedly secured to the front of frame F, the latter being part of the dock leveling equipment E. A suitable notch N may be provided in the frame for guide 28.

After cables 21, 25 pass through the frame notch N and guide 28, cable 25, which is normally in a slack condition, has the opposite end thereof passing through an opening 30 formed in the deck 11. The free end of the cable may have attached thereto a ring, cross piece, or other convenient means so as to facilitate manual upward pulling of the cable when it is desired to release lever 24 from the stop piece 22. It is preferred that opening 30 be countersunk 30a on the exposed side of the deck 11 so as to accommodate the ring or cross piece when the cable 25 is returned to its slack condition and thus, not obstruct movement of personnel and material handling equipment across the exposed surface of the deck.

With regard to cable 21, after it has passed through the notch N and guide 28, a first section 21a thereof is secured to a double block 31 which forms a component of a pulley assembly 32. The assembly 32 includes an elongated tubular housing 33 having the longitudinal axis thereof disposed in substantially transverse relation with respect to the hinge axis of the deck 11. The housing is fixedly mounted on the frame F of the leveling equipment E and is disposed beneath deck 11. Suitable cable guides 34 are mounted at opposite ends of housing 33, see FIG. 7. Opposed, longitudinally extending slots 33a may be formed in the housing 33 to permit the double block 31 to move longitudinally away from the carriage 13 when a predetermined pulling force is exerted on the second section 21b of the flexible cable 21. Section 21b, which projects from the opposite end of the housing encompasses in a conventional manner the movable double block 31 as well as a second double block 35 disposed in a longitudinally fixed position within the housing interior. Cable section 21b, after encompassing the blocks 31, 35, has one end thereof terminating within the housing 33 and secured to a stationary lug 36 formed in the housing interior.

In the illustrated embodiment, FIG. 7, each double block 31, 35 is of substantially like construction and includes a pair of sheaves 31a–b and 35a–b which are rotatably mounted on a common shaft 31c, 35c. The ends of shaft 31c are slidably disposed within the housing slots 33a. The number of sheaves per block may vary form that shown and will depend upon the mechanical advantage desired to be achieved with assembly 32. For example, a sixteen to one advantage might be preferred so that only a five pound pull on cable section 21b will produce approximately an eighty-pound turning force or torque on hook-like member 16 and cause the latter to readily move from the inoperative mode II to the operative mode I.

The desired pull on cable section 21b to effect the necessary movement of the hook-like member 16 is produced by an upward manual pulling force being applied to the free end of the cable section 21b which extends through a second suitable opening 36 formed in deck 11. Opening 36 is preferably disposed in closer proximity to the deck hinge axis X than opening 30. Opening 36 may be countersunk from the exposed side of the deck to accommodate a ringlike or barlike handle attached to the cable section free end. The manual pull on cable section 21b is effected by a person standing on the deck either before, during, or after the deck and lip being moved into operative position with the bed of the parked vehicle.

When deck 11 is in an operative load-bearing position—that is to say, it is either in a position wherein the lip L attached thereto rests upon the bed of the parked vehicle, or the lip is engaging the keepers K, FIG. 1—cable section 21b assumes a slack condition as seen in FIG. 8. To prevent the slack cable section from becoming accidentally entangled with any parts of the dock leveling equipment E and to insure that the free end of cable section 21b will be retracted into the countersunk portion of deck opening 36 when the cable end is released, a pair of springs 37, 38 are provided which are preferably located on opposite sides of the longitudinal axis of housing 33. One end 37a, 38a of each spring is fixedly secured to a portion of the frame F. The opposite or free end 37b, 38b of each spring is in sliding engagement with the cable section 21b. The spring tension exerted by each spring on the cable section is sufficient to cause the handle attached to the free end of cable section 21b, when released, to automatically seat within the countersunk portion of opening 36 and thus, not present an obstruction on the exposed surface of deck 11. Because lock element release cable 25, and the cable section 21b, are manually manipulated by the dock personnel while standing on the deck 11, locking or unlocking of the parked vehicle with respect to the dock front wall W is under the exclusive control of the dock personnel rather than the driver of the vehicle. By shifting this responsibility to the dock personnel, safety of the loading and unloading operation has been significantly improved.

Thus, it will be seen that an improved locking device has been described which can be readily installed on new or existing loading docks. The improved device is rugged and not adversely affected by varying climatic conditions and is capable of being utilized with parked vehicles wherein the ICC bars thereof may vary in size, shape, and location over a wide range.

We claim:

1. A releasable locking device for use in securing a parked vehicle to an adjacent structure, said device comprising a carriage mountable on the structure for limited relative movement in a substantially vertical plane and being biased to assume a predetermined elevated rest position; a rotary first means carried on said carriage and movable therewith in said substantially vertical plane, said first means being rotatable between an operative mode and an inoperative mode, when in said operative mode, said first means having a section thereof projecting outwardly from said carriage and being adapted to interlockingly engage the parked vehicle, and when in an inoperative mode, having said section in a depending vehicle-release position and substantially enclosed within said carriage; second means operatively connected to said first means to effect movement of the latter from said inoperative mode to said operative mode, said second means including a rotary first member carried on said carriage adjacent to said first means, said first means and said first member rotating as a unit about a common axis, a flexible second member having one end portion thereof connected to the periphery of said first member and a second end portion thereof remote from said first member for imparting a manual pull thereto to effect a predetermined tangential force in one direction on said first member and movement of said first means from said inoperative mode to said operative mode, and a unit connected to and intermediate the end portions of said flexible second member to effect the application of said predetermined tangential force on said first member from a manual pull force of substantially less magnitude applied to the second end portion of said flexible second member; and third means mounted on said carriage for releasably retaining said first means in said operative mode.

2. The device of claim 1 wherein the carriage includes follower means in movable engagement with an elongated substantially vertically extending stationary member adapted to be fixedly mounted on the adjacent structure; said follower means being disposed inwardly relative to the rotary axis of said first means.

3. The device of claim 2 wherein the carriage includes a pair of outwardly extending, relatively spaced plate members between which said first means is rotatably mounted and is substantially concealed when said first means is in said inoperative mode.

4. The device of claim 1 wherein the third means includes a manually activated elongated flexible member, independent of said flexible second member, for selectively releasing said first means from said operative mode.

5. A releasable locking device in combination with a loading dock for securing a vehicle in a parked position adjacent a substantially vertical wall of said dock, the latter including a hingedly mounted load-bearing deck movable between selected load-bearing positions; said locking device comprising a carriage mounted on the dock vertical wall and in substantial central alignment with an adjacent edge of said deck for limited relative movement in a substantially vertical plane; means coacting with said carriage for biasing same to assume a predetermined elevated rest position; a hook-like member rotatably mounted on said carriage and movable between an operative mode wherein a portion of said member projects from said carriage and is adapted to interlockingly engage the parked vehicle, and an inoperative mode wherein said hook-like member assumes a vehicle-release position and is substantially concealed within said carriage; a rotatably mounted first member coaxially disposed with respect to the axis of said hook-like member and movable therewith as a unit; a flexible second member connected to said first member for imparting thereto a predetermined force to effect movement of said hook-like member from an inoperative mode to an operative mode, said flexible second member having an end portion remote from said first member for imparting a manual pull thereto; a unit operatively connected to said flexible second member whereby the predetermined force exerted on said first member is effected by a manual pull force of substantially less magnitude imparted on the end portion of said flexible second member; a locking element adjustably mounted on said carriage and releasably engaging said first member and retaining said hook-like member in said operative mode; and manually actuated means independent of said flexible second member for effecting controlled adjustment of said locking element to a disengaged relation with respect to said first member.

6. The locking device of claim 5 wherein said hook-like member, said first member, and said locking element are mounted on said carriage and move therewith as a unit.

7. The locking device of claim 5 wherein the means for controlled adjustment of said locking element, and the end portion of the flexible second member are adapted to be manually manipulated from the load-bearing deck.

8. The locking device of claim 5 wherein the unit includes an elongated fixedly mounted assembly having one end thereof operatively connected to said first member and a second end thereof connected to the end portion of said flexible second member, said end portion having a segment extending through an opening formed in said deck; said assembly providing a substantial mechanical advantage to enhance the magnitude of a pulling force applied to the end portion of the flexible second member.

9. The locking device of claim 8 wherein the assembly includes an elongated fixedly mounted housing positioned intermediate said first member and the deck hinge axis, the longitudinal axis of said housing being substantially transverse to the rotary axis of said first member; a pair of longitudinally spaced sheaves disposed within said elongated housing, one sheave being operatively connected to the first member and being mounted for independent longitudinal adjustment relative to said housing; a portion of said flexible second member being in encompassing relation with both of said sheaves and having an end of said portion secured to said housing, the said portion being connected to the end portion of said flexible second member.

10. The locking device of claim 9 wherein the end portion of said flexible second member disposed between said housing and the deck opening normally assuming a substantially slack condition when the hook-like member is disposed in either the operative or inoperative mode, and a taut condition when hook-like member is moving from an inoperative mode to an operative mode.

11. The locking device of claim 10 wherein the end portion of the flexible second member between the deck and the end of the fixedly mounted housing is resiliently engaged by spring guide means whereby the segment of the end portion extending through the deck opening is substantially retracted within said opening when said end portion is in a slack condition.

* * * * *

UNITED STATES PATENT AND TRADEMARK OFFICE
CERTIFICATE OF CORRECTION

PATENT NO. : 4,379,354
DATED : April 12, 1983
INVENTOR(S) : Norbert Hahn, Steven J. Hipp It is certified that error appears in the above-identified patent and that said Letters Patent are hereby corrected as shown below:

Column 1, line 24
colon after "oils" should be a semi-colon

Column 3, line 16
"reear" should be -- rear --

Column 3, line 48
"heavy coil" should be -- heavy duty coil --

Column 4, line 47
"pring" should be -- spring --

Column 5, line 51
"form" should be -- from --

Signed and Sealed this

Thirteenth Day of December 1983

[SEAL]

Attest:

GERALD J. MOSSINGHOFF

Attesting Officer

Commissioner of Patents and Trademarks